United States Patent [19]

Holcombe

[11] Patent Number: 5,516,603
[45] Date of Patent: May 14, 1996

[54] FLEXIBLE BATTERY PACK

[75] Inventor: Michael W. Holcombe, Katy, Tex.

[73] Assignee: Baker Hughes Incorporated, Houston, Tex.

[21] Appl. No.: 241,273

[22] Filed: May 9, 1994

[51] Int. Cl.⁶ .................................................. H01M 2/02
[52] U.S. Cl. ........................ 429/127; 429/153; 429/155; 429/159; 429/164; 166/65.1; 166/66.4
[58] Field of Search ........................... 429/153, 154, 429/155, 159, 163, 164, 176, 127; 166/285, 66.4, 169, 65.1

[56]          References Cited

U.S. PATENT DOCUMENTS 2,798,896   7/1957  Bly ............................................ 429/127
4,749,875   2/1988  Hara .......................................... 429/127
5,302,110   4/1994  Desai et al. .............................. 429/159
5,305,181   4/1994  Schultz ..................................... 361/680
5,326,652   7/1994  Lake ......................................... 429/127
5,392,856   2/1995  Broussard, Jr. et al. ................ 166/285

OTHER PUBLICATIONS

*Minco Flex Circuit Design Guide*, Application Aid No. 24(B), Minco Products, Inc., 1992.

Primary Examiner—M. Nuzzolillo
Attorney, Agent, or Firm—Rosenblatt & Redano

[57]              ABSTRACT

A flexible battery pack for providing electrical power to a downhole tool is provided. The battery pack may be mounted in any orientation and about the interior or exterior circumference of the tool. It may further be used to provide a plurality of voltage or current levels to the tool.

16 Claims, 2 Drawing Sheets

FLEXIBLE BATTERY PACK

FIELD OF THE INVENTION

This invention relates to flexible battery packs suitable for mounting on the interior or exterior circumference of downhole tools.

BACKGROUND OF THE INVENTION

The oil and gas industry often requires tools which can be placed downhole. Some of these tools require an electrical power source to operate. To allow a tool to be easily maneuvered, the power source must fit inside of or be attachable to the tool. Because downhole tools are round and because interior space is limited, it is often impossible to use commonly available power source designs.

One of the more common portable power sources is a battery pack. These devices are constructed of rigid plastic and provide semi-cylindrical ports for installing cells. Spring-loaded retaining clips hold the cells in place and maintain electrical contact with the cells. Internal electrical connections provide the appropriate interconnection between the cells. External electrical connections allow the user to draw electrical power from the battery pack. These battery packs are essentially in the shape of a rectangular parallelepiped. Rigid battery packs such as this cannot be used in many downhole tools. They are not suitable for mounting on the exterior of a tool because their shape, size, and rigidity would obstruct the travel of the tool through the drill hole. Similarly, their shape and size often precludes their use within the tight confines of the tool's interior.

One solution to these limitations is to mount cells between two rigid boards which fit the contour of the downhole tool. Battery packs made in this fashion may be mounted on the interior wall of a tool with the cells held parallel to the longitudinal axis of the tool. Such battery packs are an improvement over the previously described battery packs, because they allow the cells to be held to the side. However, such a construction requires that a unique size of battery pack be manufactured for each tool size used. These battery packs have the additional disadvantage of only being mountable in a single orientation.

Another method of supplying electrical power is to mount a cylindrical tube in the downhole tool so that both cylinders share the same longitudinal axis. This tube-within-a-tube design allows cells to be stacked along the tool's longitudinal axis, with electrical contacts for supplying power at opposite ends of the stack of cells. This method shares the disadvantages of the other battery packs because it is rigid and must be manufactured to fit a particular tool size.

It is an object of the present invention to provide an electrical power source for use with downhole tools that may be mounted to the interior or exterior circumference of a tool.

It is another object of the invention to provide an electrical power source that is flexible and may be easily attached to a variety of downhole tools.

It is another object of the invention to provide an electrical power source that may be mounted to a downhole tool in a variety of orientations.

It is a further object of the invention to provide an electrical power source for use with oil tools which may be quickly electrically coupled and decoupled from a downhole tool.

It is another object of the invention to allow a downhole tool electrical power source to be quickly removed and attached to a different downhole tool.

It is a further object of the invention to allow an expended downhole tool electrical power source to be rapidly replaced.

SUMMARY OF THE INVENTION

A flexible battery pack is provided which may be mounted to the interior or exterior circumference of a downhole tool. Because it is flexible, it may be flattened against the surface of the tool and moved between tools of different shape or diameter without requiring specially manufactured sizes.

The battery pack has a flat, flexible base. The base comprises multiple layers of insulating material enclosing at least one circuit layer. Construction of the base is begun with a first sheet of flexible insulating material, such as DuPont KAPTON®, a polyimide film. A thin sheet of copper is laminated to one side of the first sheet of insulting material. A printed circuit layer is formed by etching the copper laminate using standard printed circuit board techniques. When complete, the electrical components used in the flexible battery pack are interconnected by the printed circuit.

Holes are cut through a second flexible insulating sheet to correspond to the terminal locations of the printed circuit layer. The second flexible insulating sheet is then laminated over the copper pattern to insulate the top of the printed circuit layer. Additional layers of copper and flexible insulating material may be added as necessary to complete the base with the desired circuit layout.

Components are added to the printed circuit by electrical connection to the printed circuit. Standard connection techniques, such as soldering, are used to provide these connections. Preferably, electric cells are combined into battery staves by electrically connecting the cells in series and providing flat tabs or wire leads from the terminal ends of the series-connected cells. The battery staves are insulated by an insulating coating, such as heat-shrink tubing. The wire leads from the staves are electrically connected to the printed circuit.

The printed circuit may be designed so that the battery pack provides a plurality of supply voltages and currents. This goal may be accomplished by providing multiple supply terminals which are connected via bus lines in the printed circuit to different combinations of series-connected and/or parallel-connected cells.

The supply terminals are electrically isolated from each other by diodes connected to the printed circuit. A diode is installed in the circuit between each positive battery stave or cell terminal and each bus line to which the battery stave or cell is connected. The diodes are installed so that they are forward biased when the potential at the battery stave or cell terminal is higher than the potential at the supply terminal to which the bus line is connected. To minimize the required voltage level of the individual cells or battery staves, Schottkey diodes, such as Motorola part number MBRS120T3, are preferred because they result in a smaller voltage drop across the diode when forward biased than non-Schottkey diodes.

DETAILED DESCRIPTION OF THE PREFERRED EMBODIMENT

Figure 1:
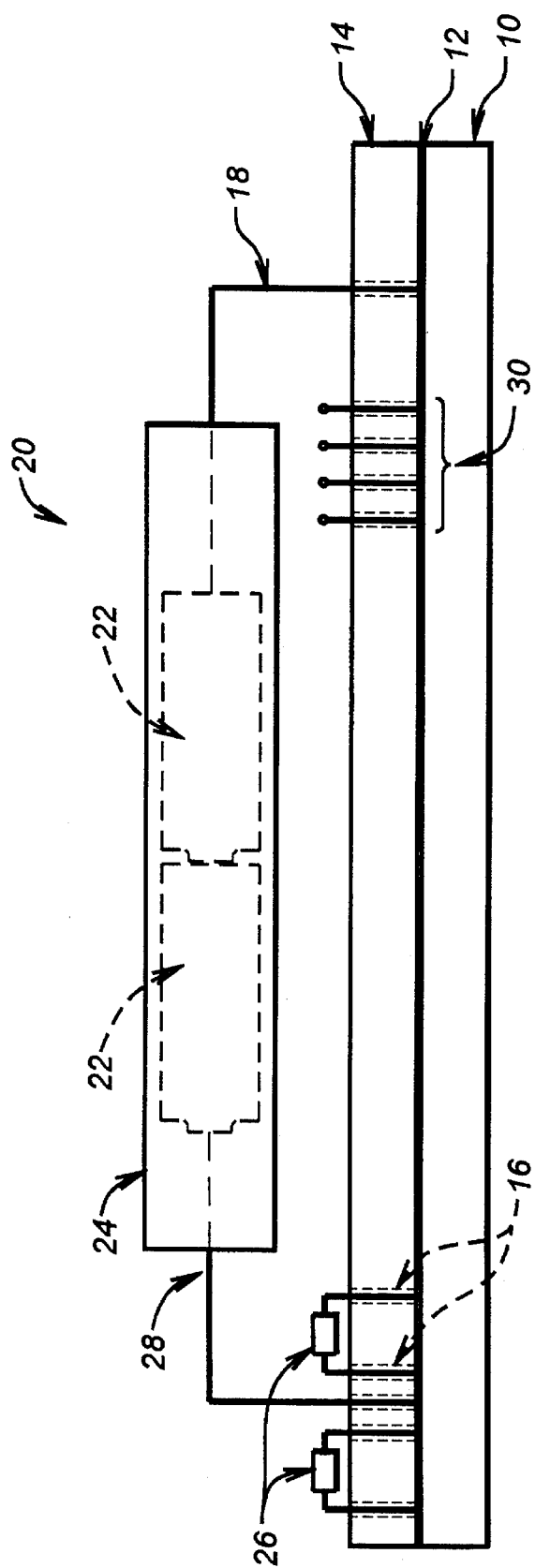
FIG. 1 is a partially cut away side view of one embodiment of the flexible battery pack.

Referring to FIG. 1, a flexible battery pack is shown having a bottom layer 10 of flexible insulating material. Laminated to the top of the bottom layer 10 is a printed circuit layer 12. Laminated over the top of the printed circuit layer 12 is a top layer 14 of the same flexible insulating material as that which forms the bottom layer 10. Holes 16 are cut through the top layer 14 to allow component leads 18 to penetrate the top layer 14 and contact the printed circuit layer 12. A battery stave 20 is electrically connected to the printed circuit layer 12 via leads 18. Cells 22 are connected in series within the battery stave 20 and protected by an insulating sheath 24. Diodes 26 are electrically connected between the more positive terminal 28 of the battery stave 20 and the remainder of the printed circuit. Output terminals 30 are electrically connected to the printed circuit layer 12 to provide electrical power to the downhole tool.

Figure 2:
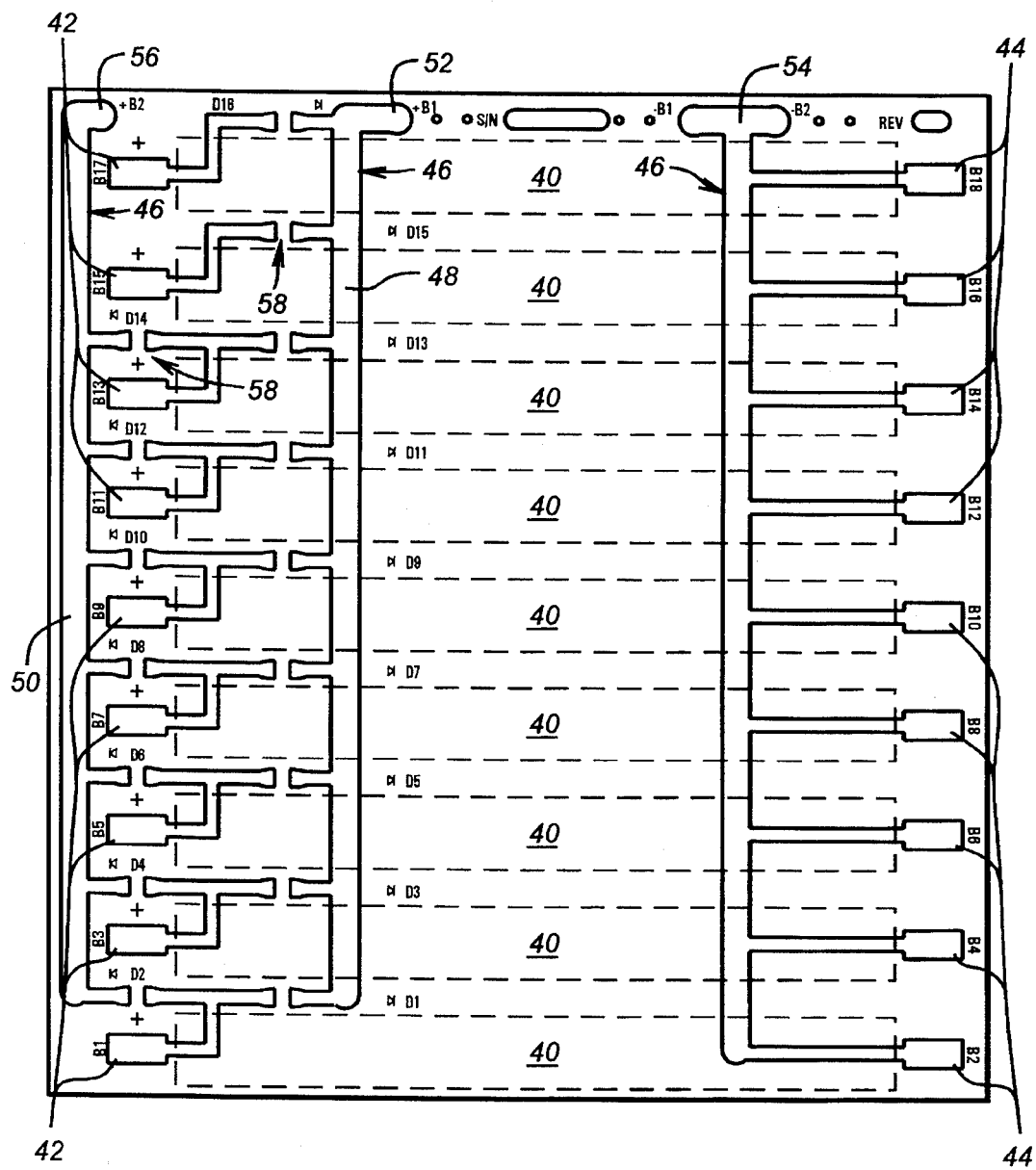
FIG. 2 is a top view of a printed circuit layout suitable for use as a flexible battery pack circuit.

Referring to FIG. 2, a printed circuit layout suitable for one embodiment of the flexible battery pack is shown. Locations for the battery staves are shown by outlines 40. Pads for electrical connection to the more positive terminals 42 and to the more negative terminals 44 of the battery staves are provided. The pads 42 and 44 are electrically connected to bus lines 46, which connect the battery staves in parallel. At the more positive terminals 42, a first bus line 48 is electrically connected to two more of the battery staves than is the second bus line 50. Thus, the potential difference between the first positive terminal 52 and the negative terminal 54 will be the same as the potential difference between the second positive terminal 56 and the negative terminal 54. The electric current available by connecting between the first positive terminal 52 and the negative terminal 54 will be greater than that available by connecting between the second positive terminal 56 and the negative terminal 54. Diodes are attached to pads 58 so that the diodes are forward biased when the potential at the more positive terminals of the battery staves 42 is greater than that at the positive terminals 52 or 56.

The foregoing disclosure and description of the invention are illustrative and explanatory thereof, and various changes in the size, shape and materials, as well as in the details of the illustrated construction, may be made without departing from the spirit of the invention.

I claim:

1. A flexible battery pack in combination with a downhole tool comprising:

a downhole tool comprising a curved mounting surface;

a flexible base, mountable to said curved mounting surface; and a means for providing electrical energy, mountable to said flexible base.

2. The battery pack of claim 1, wherein said means for providing electrical energy comprises at least one electric cell.

3. The battery pack of claim 1, wherein said means for providing electrical energy comprises a plurality of battery staves, wherein each battery stave comprises a plurality of electric cells electrically connected in series and having a more positive terminal and a more negative terminal, and wherein said electric cells are enclosed by an insulating material, such that electrical contact with said battery stave is possible only through said terminals.

4. The battery pack of claim 1, wherein said means for providing electrical energy provides a plurality of voltage levels.

5. The battery pack of claim 1, wherein said means for providing electrical energy provides a plurality of current levels.

6. The battery pack of claim 1, wherein said flexible base comprises a plurality of layers of material.

7. The battery pack of claim 1, wherein said flexible base comprises a means for electrically interconnecting electrical components.

8. The battery pack of claim 7, wherein said means for interconnecting electrical components is a printed circuit.

9. The battery pack of claim 8, wherein said printed circuit comprises conductive material laminated onto a flexible insulating material.

10. The battery pack of claim 7, wherein said means for interconnecting electrical components comprises a plurality of bus lines.

11. The battery pack of claim 7, wherein said means for interconnecting electrical components comprises at least a more positive bus line and a more negative bus line.

12. The battery pack of claim 7, wherein said means for interconnecting electrical components comprises at least a first bus line, a second bus line, and a negative terminal, wherein said bus lines are connected to the means for providing electrical energy so that a lager electric current will be available through a connection between said first bus line and said negative terminal than will be available through a connection between said second bus line and said negative terminal.

13. The battery pack of claim 7, wherein said means for interconnecting electrical components comprises at least a first bus line, a second bus line, and a negative terminal, wherein said bus lines are connected to the means for providing electrical energy so that a larger potential difference exists between said first bus line and said negative terminal than exists between said second bus line and said negative terminal.

14. The battery pack of claim 11, further comprising:

at least one source of electrical energy; and at least one diode, wherein the diode is connected between said source of electrical energy and said more positive bus line, such that said diode is forward biased when the potential of said energy source is greater than the potential of said more positive bus line.

15. A method of providing electrical energy for a downhole tool comprising the steps of:

mounting an electrical energy source to a flexible base;

mounting said flexible base to a curved mounting surface on a downhole tool; and electrically connecting said electrical energy source to a device requiring a supply of electrical energy.

16. The method of claim 15, further comprising the step of:

providing electrical interconnections in the flexible base for electrical connecting the electrical components of the electrical energy source.

\* \* \* \* \*